2,751,400

HYDROGENATION OF 11α-HYDROXYPREGNENES

Alan H. Nathan, Kalamazoo Township, Kalamazoo County, Mich., assignor to The Upjohn Company, Kalamazoo, Mich., a corporation of Michigan No Drawing. Application August 28, 1952,
Serial No. 306,942

5 Claims. (Cl. 260—397.45)

The present invention relates to the hydrogenation of steroid compounds and is more particularly concerned with a novel process for the hydrogenation of 3,20-diketo-11α-hydroxy-4-pregnenes in the 4(5)-position of the steroid nucleus, with hydrogen, in the presence of a palladium catalyst.

This application is a continuation-in-part of copending applications, Serial Number 244,744, filed August 31, 1951, and Serial Number 265,527, filed January 8, 1952, now Patent No. 2,647,135.

It is an object of the present invention to provide a process for the hydrogenation of 3,2-diketo-11α-hydroxy-4-pregnenes, with hydrogen, in the presence of a palladium catalyst. Another object of the present invention is to provide a hydrogenation process which results in the formation of a high proportion of hydrogenated product having the normal stereochemical configuration of hydrogen at carbon atom five of the steroid nucleus. Other objects of the present invention will be apparent to those skilled in the art to which this invention pertains.

As previously stated, the process of the present invention results predominantly in the formation of the normal stereochemical configuration of hydrogen at carbon atom five in the steroid nucleus. The normal isomer can be consistently obtained as the predominant isomer, and yields of 65 per cent and better are frequently attained. Production of the normal isomer, and in such high yields, is wholly unexpected in view of the prior art experience which shows that hydrogenation of the double bond in the 4(5)-position generally results in formation of the allo configuration at carbon atom five or a mixture of the allo and normal configurations with the allo form predominating. [Butenandt, Tscherning and Hanisch, Berichte, 68, 2097 (1935); Butenandt and Fleischer, Berichte, 68, 2094 (1935)]. A recent report by Pataki et al., J. Biol. Chem., 195, 751 (1952) showed that the catalytic hydrogenation of 11-oxygenated Δ⁴-3-keto-steroids leads chiefly to the allo isomer. It was found that hydrogenation of corticosterone acetate (11β-hydroxy-21-acetoxy-progesterone) with a ten per cent palladium-barium sulfate catalyst gave seventy per cent of the allo isomer; hydrogenation of 11-ketoprogesterone in a similar manner gave 68 per cent of the pure allo isomer; hydrogenation of Kendall's Compound F acetate (11β,-17α-dihydroxy-21-acetoxyprogesterone) gave 82 per cent allo isomer. Hydrogenation of cortisone acetate (11-keto-17α-hydroxy-21-acetoxyprogesterone) with a ten per cent palladium-barium sulfate catalyst gave seventy per cent of the allo isomer [Djerassi et al., J. Biol. Chem., 194, 115 (1952)]. Similarly, Mason et al., J. Biol. Chem., 120, 733 (1937), report a yield of eighty per cent of the allo isomer when hydrogenating dehydrocorticosterone (11-keto-21-hydroxyprogesterone) with hydrogen in the presence of palladium black catalyst.

The fact that the process of the present invention results predominantly in the formation of the isomer having the normal configuration at the 5-position, is of considerable commercial significance and utility. The present state of the art shows that in the preparation of physiologically active adrenal hormones such as, for example, cortisone from Δ⁴ pregnene compounds, it is necessary to eliminate the Δ⁴-double bond while other transformations are accomplished in the molecule. When these transformations, i. e., formation of the proper side-chain, establishment of the proper group at position 11, and the like, are accomplished, the double bond is again introduced at the 4(5)-position. This step of reestablishing the double bond is dependent on the configuration of the molecule at position 5. Compounds with the allo configuration can be converted to the 4(5)-unsaturated compounds only with difficulty and in low yields, whereas in compounds with the normal configuration the double bond at the 4(5)-position can be formed easily and in good yields (U. S. Patent 2,590,993).

Starting materials for the process of the present invention are 3,20-diketo-11α-hydroxy-4-pregnenes represented by the following basic structural formula:

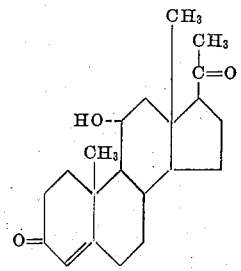

These compounds may in addition have substituents, such as, for example, ketone, hydroxy, acyloxy, carboxy, carbalkoxy, and the like, attached to one or more of the carbon atoms of the molecule such as, for example, in the 6, 7, 12, 17, 21 and other positions.

According to the process of the present invention a 3,20-diketo-11α-hydroxy-4-pregnene, preferably 11α-hydroxyprogesterone, is hydrogenated with hydrogen in the presence of a palladium catalyst such as, for example, palladium black, palladium on charcoal, palladium on an ion exchange resin, palladium on barium sulfate, palladium on magnesium oxide, palladium on calcium carbonate, or the like, to produce a 3,20-diketo-11α-hydroxypregnane. The preferred order of hydrogenation is first to subject the palladium catalyst to hydrogen in conventional hydrogenation apparatus to reduce the catalyst prior to the introduction of the starting steroid material. It is not essential that the catalyst be in a solvent medium, but methanol, hexane, acetone, methyl ethyl ketone, ethanol, or like organic solvent may be advantageously employed. Preferably, an alcohol solvent is used. Alternatively, the catalyst and starting steroid to be hydrogenated can be contacted together in a solvent medium prior to introduction of the hydrogen. It is not necessary to conduct the reaction under pressure, although, when pressure is utilized, a hydrogen pressure of about one to 100 pounds or more is operative. Any suitable temperature between about zero and 100 degrees centigrade may be employed, with room temperature being satisfactory. Sometimes a small amount of a base such as, for example, sodium hydroxide, potassium hydroxide, pyridine, triethylamine, or the like, is added to the reaction mixture in order to enhance the yield of the normal isomer. In the preferred embodiment of the present invention, the starting steroid material is added to the already reduced catalyst and hydrogenation with hydrogen at atmospheric pressure continued until approximately one molar equivalent of hydrogen has been absorbed. The use of substantially less than one molar equivalent of hydrogen results in the incomplete saturation of the double bond in the 4(5)-position of the steroid nucleus, whereas the use of substantially more than one molar equivalent of hydrogen does not appear to increase the yield of hydrogenated product. The spent catalyst is then separated from the solution containing the hydrogenated products by conventional procedure, such as by filtration, centrifugation or decantation. Filtration is preferred. Conventional separation or extraction procedures can be used in obtaining the hydrogenated product from the solution. Preferably, the hydrogenated product is separated into its normal and allo fractions chromatographically by passage through a column packed with a mixture of diatomaceous material, colloidal clays, activated carbons, or other conventional adsorbents, followed by development of the adsorbed reaction products with organic solvents, such as acetone, ethyl acetate, carbon tetrachloride, hexane, methylene chloride, chloroform, methyl ethyl ketone, or mixtures of such solvents. In some instances, elution of the adsorbed hydrogenated products with selective solvents is desirable, as in the chromatographing of 11α-hydroxypregnane-3,20-dione wherein acetone is preferred and 11α-hydroxyallopregnane-3,20-dione wherein methylene chloride is preferred. The eluted fractions may be evaporated to dryness leaving the crystalline residue of the desired hydrogenated product which can then be further purified by crystallization from ordinary organic solvents. Alternatively, separation may be achieved by other conventional procedures such as, for example, fractional crystallization. In some instances, as in the separation of 11α-hydroxypregnane-3,20-dione and 11α-hydroxyallopregnane-3,20-dione, fractional crystallization does not result in a true representation of the amounts of normal and allo isomers present in the hydrogenation reaction product. The normal isomer is more difficultly isolated and consequently the recovery of the normal isomer in such manner often represents a lower yield of normal isomer than actually attained. In such cases it is preferred to use chromatography for the separation.

The following examples are illustrative of the process and products of the present invention, but are not to be construed as limiting.

*Example 1.—Pregnane-11α-ol-3,20-dione (11α-hydroxy-3,20-diketo-pregnane) and allopregnane-11α-ol-3,20-dione (11α-hydroxy-3,20-diketoallopregnane)*

A solution of 250 milligrams (0.75 millimole) of 11α-hydroxy-progesterone [Peterson and Murray, J. Am. Chem. Soc., 74, 1871 (1952)] in 100 milliliters of ethanol containing six drops of triethylamine was subjected to hydrogenation at room temperature under a pressure of about ten pounds of hydrogen in the presence of 45 milligrams of a thirty per cent palladium-charcoal catalyst in a Parr apparatus with an auxiliary mercury manometer. The time required for the hydrogenation was about twenty minutes. The reaction mixture was filtered and the solvent was evaporated to yield 265 milligrams of material melting at 145–185 degrees centigrade. This product was extracted with a mixture of one milliliter of ether and nine milliliters of Skellysolve B (petroleum ether, boiling range 60–70 degrees centigrade). On standing, the extract deposited eighty milligrams (32 per cent) of pregnane-11α-ol-3,20-dione as feathery needles which melted at 85–90 degrees centigrade. Recrystallization from a mixture of about six drops of ethyl acetate and five milliliters of Skellysolve B did not change the melting point.

*Analysis.*—Percent calculated for $C_{21}H_{32}O_3$: C, 75.86; H, 9.70. Found: C, 76.13; H, 9.63.

The residue from the above extraction weighed 146 milligrams (58 per cent) and melted at 165–185 degrees centigrade. Recrystallization from ethyl acetate gave 85 milligrams (34 per cent) of allopregnane-11α-ol-3,20-dione melting at 193–196 degrees centigrade with softening at about 190 degrees. A purified sample melted at 198.5–199.5 degrees centigrade.

*Analysis.*—Percent calculated for $C_{21}H_{32}O_3$: C, 75.86; H, 9.70. Found: C, 75.59; H, 9.98.

The separation of the normal and allo pregnanes was also accomplished by chromatography. An intimate mixture of 16.7 grams of Celite S–545 and 8.3 grams of Darco G–60 was wet packed with about 150 milliliters of methanol into a column three centimeters wide. (The ratio of fifty grams of adsorbent to one gram of the reaction mixture, as used here, was satisfactory in cases where the normal form predominated. When the allo form was the major component or when the composition of the mixture was not known, a ratio of 100:1 was used.) About two pounds of air pressure was applied until the liquid had dropped to the level of the adsorbent. A plug of cotton was packed on top of the adsorbent and the column was washed with one 200-milliliter fraction of methanol and two 200-milliliter fractions of acetone. The reaction product from the hydrogenation in methanol of 500 milligrams of 11α-hydroxyprogesterone, according to the procedure above-described, was dissolved in 200 milliliters of acetone and added to the column. This fraction, after passing through the column, was termed the first eluate fraction. It was followed by eight 200-milliliter fractions of acetone and four 200-milliliter fractions of methylene chloride. (For the elutions about eight milliliters of solvent per gram of adsorbent was satisfactory.) Each new fraction was added when the level of the preceding one reached the cotton plug. The pregnane-11α-ol-3,20-dione was usually obtained by evaporation of fractions 2–6 while the allopregnane-11α-ol-3,20-dione was obtained by evaporation of fractions 10–12. Following are the results of a typical separation:

| Fraction No. | Solvent | Wt. in Milligrams |
| --- | --- | --- |
| 1 | Acetone | 0 |
| 2 | do | [1] 132 |
| 3 | do | [1] 113 |
| 4 | do | [1] 43 |
| 5 | do | [1] 22 |
| 6 | do | [1] 13 |
| 7 | do | 9 |
| 8 | do | 7 |
| 9 | do | 5 |
| 10 | Methylene chloride | [2] 64 |
| 11 | do | [2] 44 |
| 12 | do | [2] 15 |
| 13 | do | 7 |

[1] Normal, 323 mg., 64 percent.
[2] Allo, 123 mg., 24 percent.

A 0.55 gram sample of the normal form as obtained above was dissolved in ten milliliters of acetone, twenty milliliters of warm water was added, and the solution was allowed to cool gradually at room temperature and finally was placed in a refrigerator. Crystallization occured and 0.38 gram (69 per cent recovery) of pregnane-11α-ol-3,20-dione was obtained which melted at 55–70 degrees centigrade. The melting point of the normal form was extremely variable, ranging from that given above to 115–120 degrees centigrade. The variability in melting point did not affect the utility of the various batches as the same results were obtained when these batches were employed in further operations.

*Example 2.—Hydrogenation of 11α-hydroxyprogesterone*

Following the procedure of Example 1, a series of experiments were conducted wherein 11α-hydroxyprogesterone was hydrogenated in the presence of different palladium catalysts. The reactions were conducted in methanol as solvent. The reduction product was separated into the normal (11α-hydroxypregnane-3,20-dione) and allo (11α-hydroxyallopregnane-3,20-dione) isomers by chromatography as described in Example 1. Table I shows the catalyst and the per cent yield of normal and allo isomers.

TABLE I

| Catalyst | Percent Normal | Percent Allo |
|---|---|---|
| 4% Pd-polyvinylalcohol | 50 | 30 |
| 1% Pd-Charcoal | 57–62 | 32–35 |
| 5% Pd-BaSO$_4$ | 42 | 39 |
| 5% Pd-SiO$_2$ | 44 | 32 |
| 4% Pd-Celite (magnesium silicate) | 54 | 45 |
| 5% Pd-MgO | 49 | 51 |
| Pd | 47 | 45 |
| 5% Pd-Al$_2$O$_3$ | 63 | 37 |
| 30% Pd-Charcoal | 55 | 38 |
| 5% Pd-MgCO$_3$ | 52 | 48 |
| 15% Pd-CuCO$_3$ | 63 | 31 |

*Example 3.—Hydrogenation of 11α-hydroxyprogesterone*

Following the procedure of Example 1, a series of experiments were conducted wherein 11α-hydroxyprogesterone was hydrogenated in different solvents. The catalyst was one per cent palladium on charcoal. The product was separated into the normal (11α-hydroxypregnane-3,20-dione) and allo (11α-hydroxyallopregnane-3,20-dione) isomers by chromatography as described in Example 1. Table II shows the solvent and the per cent yield of the normal and allo isomers.

TABLE II

| Solvent | Percent Normal | Percent Allo |
|---|---|---|
| Diethyl ether | 68 | 30 |
| Ethylene glycol | 68 | 30 |
| Acetone | 60 | 39 |
| Ethylcellosolve | 64 | 35 |
| Dioxane | 56 | 44 |
| i-Propyl alcohol | 59 | 40 |
| Ethyl acetate | 51 | 49 |
| Glycerin | 63 | 37 |
| Acetic acid | 65 | 35 |
| Methanol | 68 | 32 |
| 95% Methanol | 59 | 40 |
| 50% Methanol | 60 | 39 |

*Example 4.—Hydrogenation of 11α-hydroxyprogesterone*

Following the procedure of Example 1, a series of experiments were conducted wherein 11α-hydroxyprogesterone was hydrogenated under different pressures. The catalyst was one per cent palladium on charcoal and the solvent was methanol. The product was separated into the normal (11α-hydroxypregnane-3,20-dione) and allo (11α-hydroxyallopregnane-3,20-dione) isomers by chromatography as described in Example 1. Table III shows the pressure and the per cent yield of normal and allo isomers.

TABLE III

| H$_2$ Pressure (lbs.) | Percent Normal | Percent Allo |
|---|---|---|
| 1 | 68.8 | 26.4 |
| 5 | 66.6 | 29.6 |
| 11 | 67.6 | 26.7 |
| 15 | 66.1 | 27.9 |
| 18 | 65.8 | 28.4 |
| 20 | 68.3 | 27.6 |
| 29 | 64.5 | 27.4 |
| 56 | 63.3 | 29.9 |

*Example 5.—Hydrogenation of 11α,17α-dihydroxyprogesterone*

Following the procedure of Example 1, 11α,17α-dihydroxyprogesterone (prepared by the oxygenation of 17α-hydroxyprogesterone with a fungus of the order of Mucorales as described by Murray and Peterson in U. S. Patent 2,602,769) is hydrogenated with hydrogen in the presence of palladium on charcoal catalyst to produce a hydrogenation mixture containing the normal isomer, 11α,17α-dihydroxypregnane-3,20-dione, as the major component.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the saturation of the double bond in the 4(5)-position of a 3,20-diketo-11α-hydroxy-4-pregnene, to produce a high proportion of hydrogenated product having the normal stereochemical configuration of hydrogen at carbon atom five of the steroid nucleus, which comprises hydrogenating a 3,20-diketo-11α-hydroxy-4-pregnene, with hydrogen, in the presence of a palladium hydrogenation catalyst.

2. A process for the saturation of the double bond in the 4(5)-position of a 3,20-diketo-11α-hydroxy-4-pregnene, to produce a high proportion of hydrogenated product having the normal stereochemical configuration of hydrogen at carbon atom five of the steroid nucleus, which comprises hydrogenating a 3,20-diketo-11α-hydroxy-4-pregnene, with hydrogen, in the presence of palladium black catalyst, until about one molar equivalent of hydrogen has been absorbed.

3. A process for the saturation of the double bond in the 4(5)-position of 11α-hydroxyprogesterone, to produce a high proportion of hydrogenated product having the normal stereochemical configuration of hydrogen at carbon atom five of the steroid nucleus, which comprises hydrogenating 11α-hydroxyprogesterone, with hydrogen, in the presence of a palladium hydrogenation catalyst, until about one molar equivalent of hydrogen has been absorbed.

4. A process for the saturation of the double bond in the 4(5)-position of a 3,20-diketo-11α-hydroxy-4-pregnene, to produce a high proportion of hydrogenated product having the normal stereochemical configuration of hydrogen at carbon atom five of the steroid nucleus, which comprises hydrogenating a 3,20-diketo-11α-hydroxy-4-pregnene, with hydrogen, in the presence of palladium on charcoal catalyst, until about one molar equivalent of hydrogen has been absorbed.

5. A process for the saturation of the double bond in the 4(5)-position of 11α-hydroxyprogesterone, to produce a high proportion of hydrogenated product having the normal stereochemical configuration of hydrogen at carbon atom five of the steroid nucleus, which comprises hydrogenating 11α-hydroxyprogesterone, with hydrogen, in an organic solvent and in the presence of base and of palladium on charcoal catalyst, until about one molar equivalent of hydrogen has been absorbed, and separating the 11α-hydroxypregnane-3,20-dione and 11α-hydroxyallopregnane-3,20-dione present in the hydrogenation product.

References Cited in the file of this patent

Fieser et al.: Natural Products Related to Phenanthrene, 3d ed., pp. 417–22 (1949).

Fieser et al.: Natural Products Related to Phenanthrene, 3d ed., pp 98–99 (1949).